(12) United States Patent
Beyer et al.

(10) Patent No.: US 7,940,748 B2
(45) Date of Patent: *May 10, 2011

(54) SYSTEMS, METHODS AND COMPUTER PROGRAM PRODUCTS SUPPORTING PROVISION OF WEB SERVICES USING IMS

(75) Inventors: Loraine Beyer, Hoover, AL (US); Amy Zwarico, Mountain Brook, AL (US)

(73) Assignee: AT&T Intellectual Property I, LP, Reno, NV (US)

( * ) Notice: Subject to any disclaimer, the term of this patent is extended or adjusted under 35 U.S.C. 154(b) by 1129 days.

This patent is subject to a terminal disclaimer.

(21) Appl. No.: 11/560,884

(22) Filed: Nov. 17, 2006

(65) Prior Publication Data

US 2008/0120425 A1    May 22, 2008

(51) Int. Cl.
*H04L 12/66* (2006.01)
(52) U.S. Cl. .................. 370/352; 370/356; 370/355
(58) Field of Classification Search .......... 370/352, 370/356, 412, 401, 465, 329, 345, 355; 709/203, 709/226, 229, 230; 726/4, 5; 379/202.01; 455/412.1
See application file for complete search history.

(56) References Cited

U.S. PATENT DOCUMENTS

| 2005/0058125 | A1* | 3/2005 | Mutikainen et al. .......... 370/354 |
| 2007/0206613 | A1* | 9/2007 | Silver et al. ................... 370/401 |
| 2007/0282911 | A1* | 12/2007 | Bantukul et al. ........... 707/104.1 |
| 2008/0291930 | A1* | 11/2008 | Damola et al. ................ 370/401 |
| 2009/0070469 | A1* | 3/2009 | Roach et al. .................. 709/226 |
| 2009/0093237 | A1* | 4/2009 | Levenshteyn et al. ..... 455/412.1 |

OTHER PUBLICATIONS

"Module 8: Overview of SIP," Course: Deploying Microsoft Office Live Communication Server 2003, www.Microsoft.com; Nov. 2003, 15 pages.
"3rd Generation Partnership Project; Technical Specification Group Services and System Aspects; 3G Security; Security architecture (Release 7)"; 3GPP TS 33.102 V7.0.0 (Dec. 2005) Technical Specification, Valbonne, France, 2005, 63 pages.

* cited by examiner

*Primary Examiner* — Jean A Gelin
(74) *Attorney, Agent, or Firm* — Myers Bigel Sibley & Sajovec

(57) ABSTRACT

A Session Initiation Protocol (SIP) message including an embedded web service request is received at an IMS network from a device. The received SIP message is protocol translated to generate a non-IMS message including the web service request. The non-IMS message is conveyed to a web service provider, and a requested web service corresponding to the non-IMS message is conveyed from the web service provider to the device. The SIP message may include a SIP INVITE message containing an embedded SOAP message.

14 Claims, 9 Drawing Sheets

SYSTEMS, METHODS AND COMPUTER PROGRAM PRODUCTS SUPPORTING PROVISION OF WEB SERVICES USING IMS

BACKGROUND OF THE INVENTION

The present invention relates generally to distributed computing and, more particularly, to delivering web services.

The Internet protocol (IP) Multimedia Subsystem (IMS) is a standard that has been developed to define the control and integration of multimedia services in a core, packet-switched network. In particular, the IMS architecture defines a set of logical functions that use a signaling protocol known as the session initiation protocol (SIP) to establish communication sessions in an IP network. A "session" may be, for example, a one-to-one voice call or a more complex interaction, such as a one-to-many conference call involving multimedia services. SIP may also be used to facilitate voice over IP (VoIP) services, in which voice is transported in IP data packets that are re-assembled and converted into an audio signal for the recipient. IMS may be characterized as a standardized way to connect IP devices and networks using SIP.

A web service is a reusable piece of software that interacts by exchanging messages over a network. Commonly, web services use Simple Object Access Protocol (SOAP), a protocol for exchanging XML-based messages. A common messaging pattern in SOAP is the Remote Procedure Call (RPC) pattern, in which one a web service requester sends a request message to a web service provider, and the web service provider sends a response message that provides the requested service, for example, the result of applying a particular procedure based on parameters passed in the web service request.

Generally, it is desirable that a web service have some type of authentication capability, such that unauthorized access to the service may be prevented. A variety of different authentication techniques may be used for web services, including transmisssion of credentials to the web service provider with or without encryption, digest techniques in which credentials may be hashed on the client and server and the results compared, and third party certificate approaches wherein a user requests and installs a certificate from a trusted third party (e.g., Verisign, Entrust, etc.), and the web service provider can query the third party to verify credentials as required.

SUMMARY

Some embodiments of the present invention provide methods of operating an IP Multimedia Subsystem (IMS) network to support provision of web services. A Session Initiation Protocol (SIP) message including an embedded web service request is received from a device. The received SIP message is protocol translated to generate a non-IMS message including the web service request. The non-IMS message is conveyed to a web service provider, and a requested web service corresponding to the non-IMS message is conveyed from the web service provider to the device. The SIP message may include a SIP INVITE message containing an embedded SOAP message.

Receiving a SIP message may include receiving the SIP message at a Proxy Call Session Control Function (P-CSCF). Protocol translating the received SIP message to generate a non-IMS message including the web service request may be preceded by forwarding the received SIP message from the P-CSCF to a protocol translation SIP application server (AS). Protocol translating the received SIP message to generate a non-IMS message including the web service request may include generating the non-IMS message from the forwarded SIP message at the protocol translation SIP AS. Conveying the non-IMS message to a web service provider may include conveying the non-IMS message from the protocol translation SIP AS to the web service provider.

The SIP message may include a first SIP message, and providing the requested web service to the device responsive to receipt of the non-IMS message at the web service provider may include transmitting a web service response providing the requested web service to the protocol translation SIP AS, protocol translating the web service response to generate a second SIP message including the web service response, and transmitting the second SIP message to the P-CSCF. The web service request and web service response may include respective Simple Object Access Protocol (SOAP) messages.

Further embodiments of the present invention provide methods of supporting web services in an IMS network. A SIP message including an embedded web service request is received from a P-CSCF of the IMS, e.g., at a protocol translation SIP AS. The received SIP message is protocol translated to generate a non-IMS message including the web service request. The non-IMS message is transmitted to a web service provider.

The present invention also provides apparatus configured to perform the above-described methods and computer program products including computer program code configured to perform the above-described methods.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
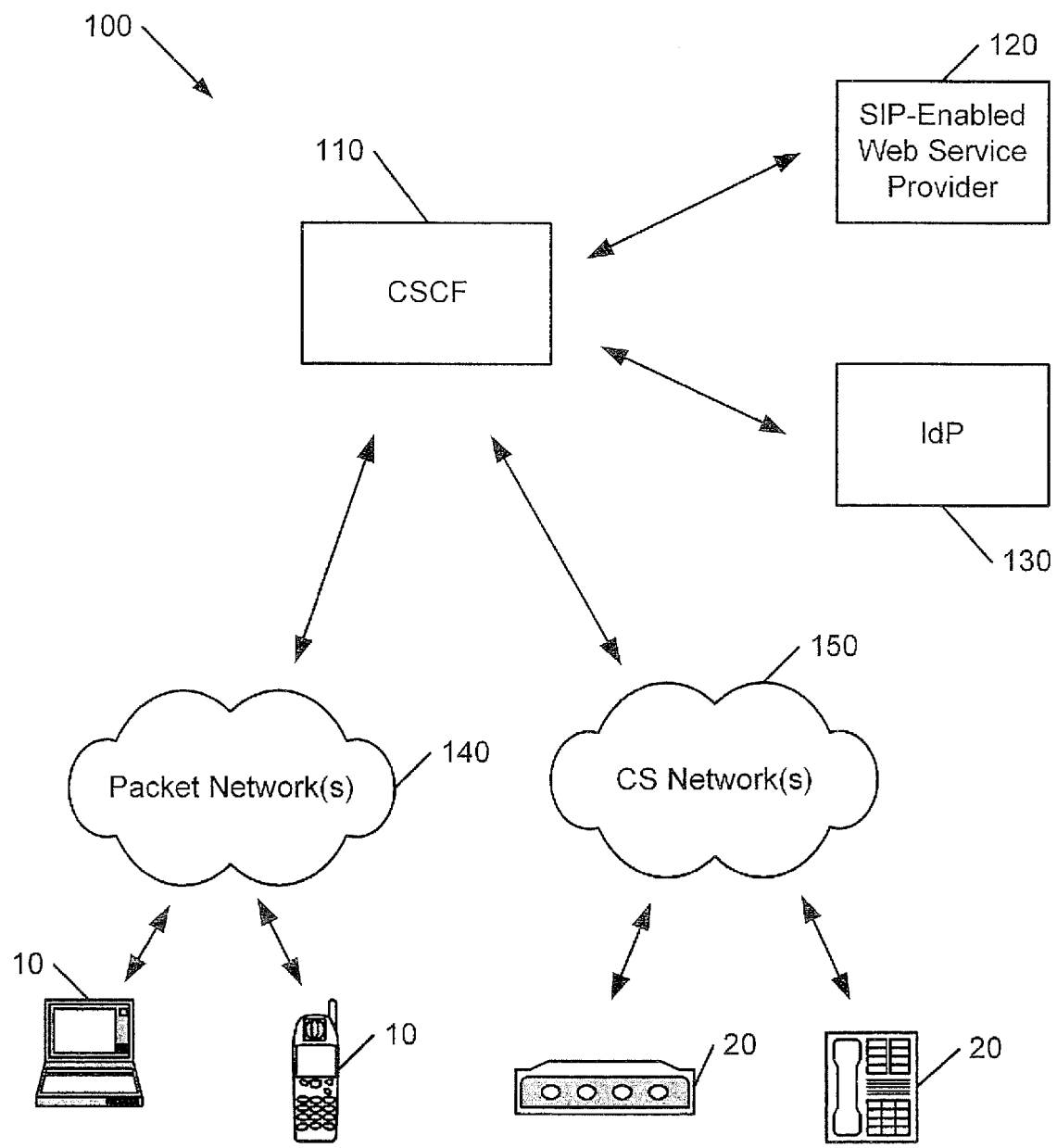
FIG. 1 is a schematic diagram illustrating an IMS network and operations thereof in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "SIP enabled" refers to a capability of an apparatus to communicate using the session initiation protocol (SIP). As used herein, the term "packet" means a unit of information and/or a block of data that may be transmitted electronically as a whole or via segments from one device to another. Accordingly, as used herein, the term "packet" may encompass such terms of art as "frame" and/or "message," which may also be used to refer to a unit of transmission.

The present invention is described hereinafter with reference to flowchart and/or block diagram illustrations of methods, mobile terminals, electronic devices, alarm systems, and/or computer program products in accordance with some embodiments of the invention.

These flowchart and/or block diagrams further illustrate exemplary operations of operating an IMS network in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Some embodiments of the present invention stem from a realization that characteristics of IMS may be advantageously used to support web services delivery. In particular, in some embodiments of the present invention, web services may be delivered in an authenticated manner using session identification capabilities of IMS, such that authentication communications between a device requesting a web service and the providing web service provider are not required.

Referring now to FIG. 1, an IMS network 100 configured according to some embodiments of the present invention comprises apparatus configured to provide a variety of different functions linked by standardized interfaces. Generally, functions of the IMS network 100 include a bundle of functions of SIP servers or proxies, collectively referred to as Call Session Control Function (CSCF) 110, which are used to to process SIP signalling packets in the IMS network 100. It will be appreciated that the CSCF 110 may not necessarily be a single node (e.g., a discrete piece of hardware), as CSCF function may be distributed over multiple nodes. Functions of CSCF 110 may include: registration of devices with the IMS network 100; routing and inspection of signalling messages; authentication of users and establishment of security associations; compression, decompression and other signal processing functions; authorization of resources; policy enforcement; bandwidth management; and generation of charging records. It will be understood that these functions may be apportioned among several call session control function proxies or servers, such as Proxy-CSCF(P-CSCF), Interrogating-CSCF (I-CSCF) and Serving-CSCF (S-CSCF), and various other functions, gateways and the like.

As further shown, the CSCF 110 may interface with packet data and circuit switched networks 140, 150, which provide connectivity to the IMS network 100 for devices 10, 20, such as cell phones, WiFi-equipped computing devices, conventional telephones, modems, and other devices. A device may connect to the IMS network 100 using any of a number of different interfaces, generally depending on the nature of the device.

According to the illustrated embodiments of FIG. 1, a SIP-enabled web service provider 120 is configured to provide web services to devices 10 using SIP messages communicated over the IMS network 100. Authentication of SIP-based web service requests routed from a device 10 to the web service provider 120 may be provided by an Identity Provider (IdP) 130 configured to autheticate an IMS identity associated with the SIP-based web service request. Such authentication may take advantage of the built-in trust relationship provided by the IMS network, such that re-authentication of the source device is not required for each web service request.

Figure 2:
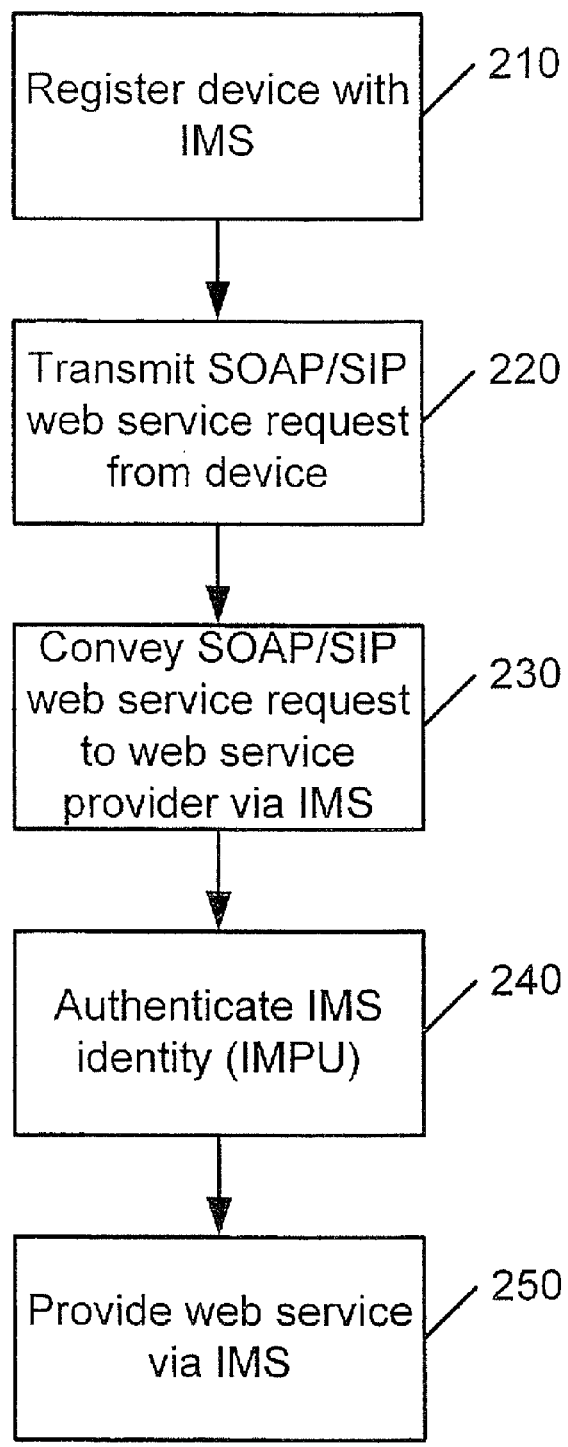
FIG. 2 is a flowchart that illustrates operations for providing web services according to some embodiments of the present invention.

Exemplary operations for provision of web services according to further embodiments of the present invention are illustrated in FIG. 2. A device is registered with the IMS network (block 210). Subsequently, the device transmits a SIP message including an embedded web service request, e.g., a SOAP message (block 220). The SIP message including the embedded web service request is conveyed via the IMS network to the SIP-enabled web service provider (block 230). In response, the SIP-enabled web service provider authenticates an IMS identity (e.g., an IP Multimedia Public Identity (IPMU) and/or IP Multimedia Private Identity (IMPI)) included in the received SIP message (block 240). Responsive to authentication of the IMS identity, the web service provider provides the requested web service via the IMS network (block 250).

Figure 3:
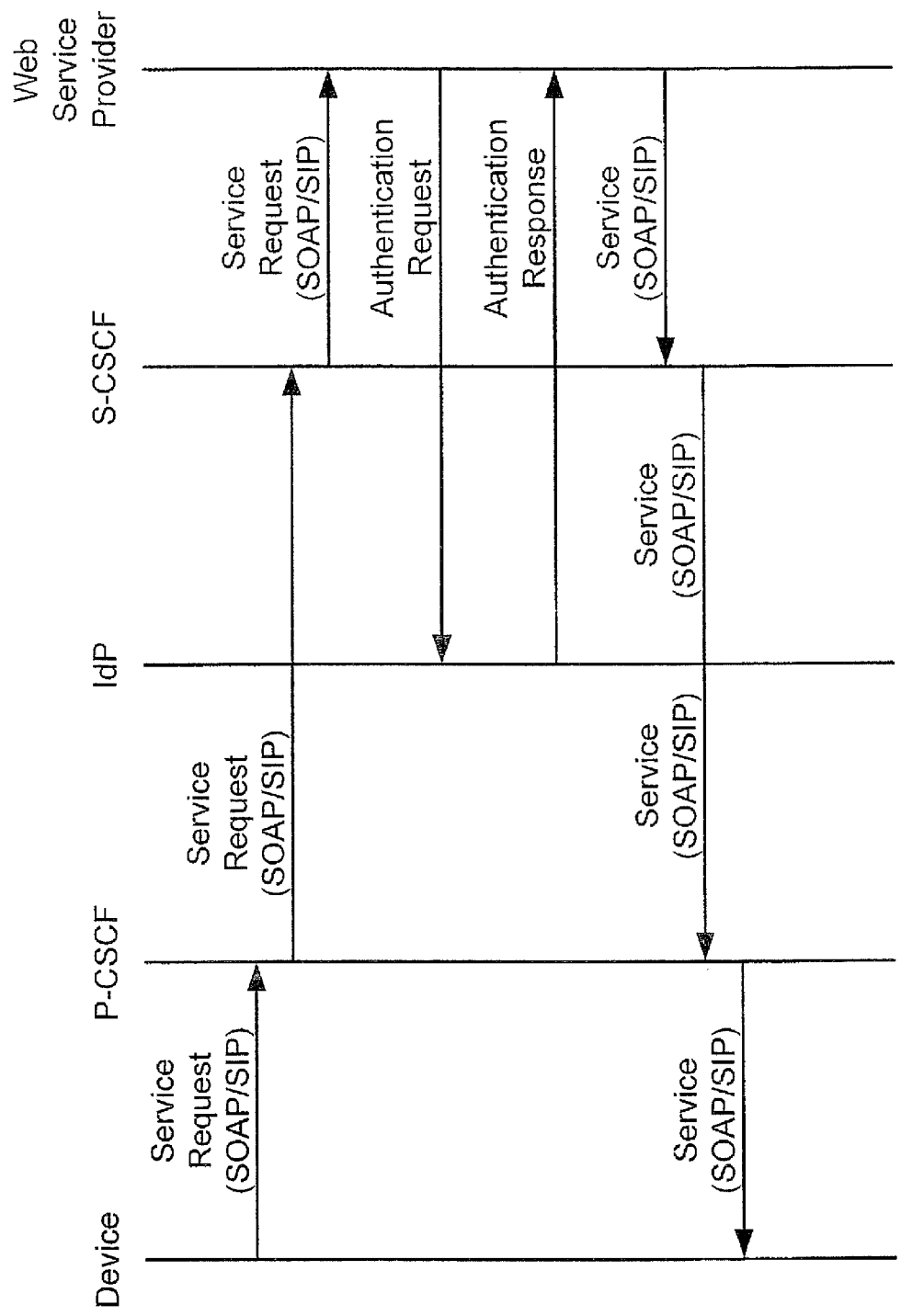
FIG. 3 is a message flow diagram illustrating apparatus and operations for supporting authenticate web service delivery according to some embodiments of the present invention.

FIG. 3 illustrates an exemplary implementation of such procedures according to further embodiments of the present invention. A device transmits a SIP message, which includes a SOAP message embedded therein that defines a web service request, to a Proxy CSCF (P-CSCF) of an IMS network. The SIP message may be, for example, a SIP INVITE message that includes a Request-URI, Call-ID, "from" and "to" header fields, and one or more Private (P)-headers. After validation of the Call-ID in the SIP INVITE messsage, the P-CSCF forwards the SIP message to the web service provider via a Serving CSCF (S-CSCF). In response to receipt of the SIP message at the web service provider, the web service provider transmits an authentication request including an IMS identifier associated with the received SIP message to an IMS IdP, which verifies that a session with that identifier exists. The IdP transmits an authentication response to the web service provider, which responsively provides the requested web service to the device via the IMS network. In this manner, no additional authentication communication between the web service provider and the device is required, as the IMS network provides the required trust.

Figure 4:
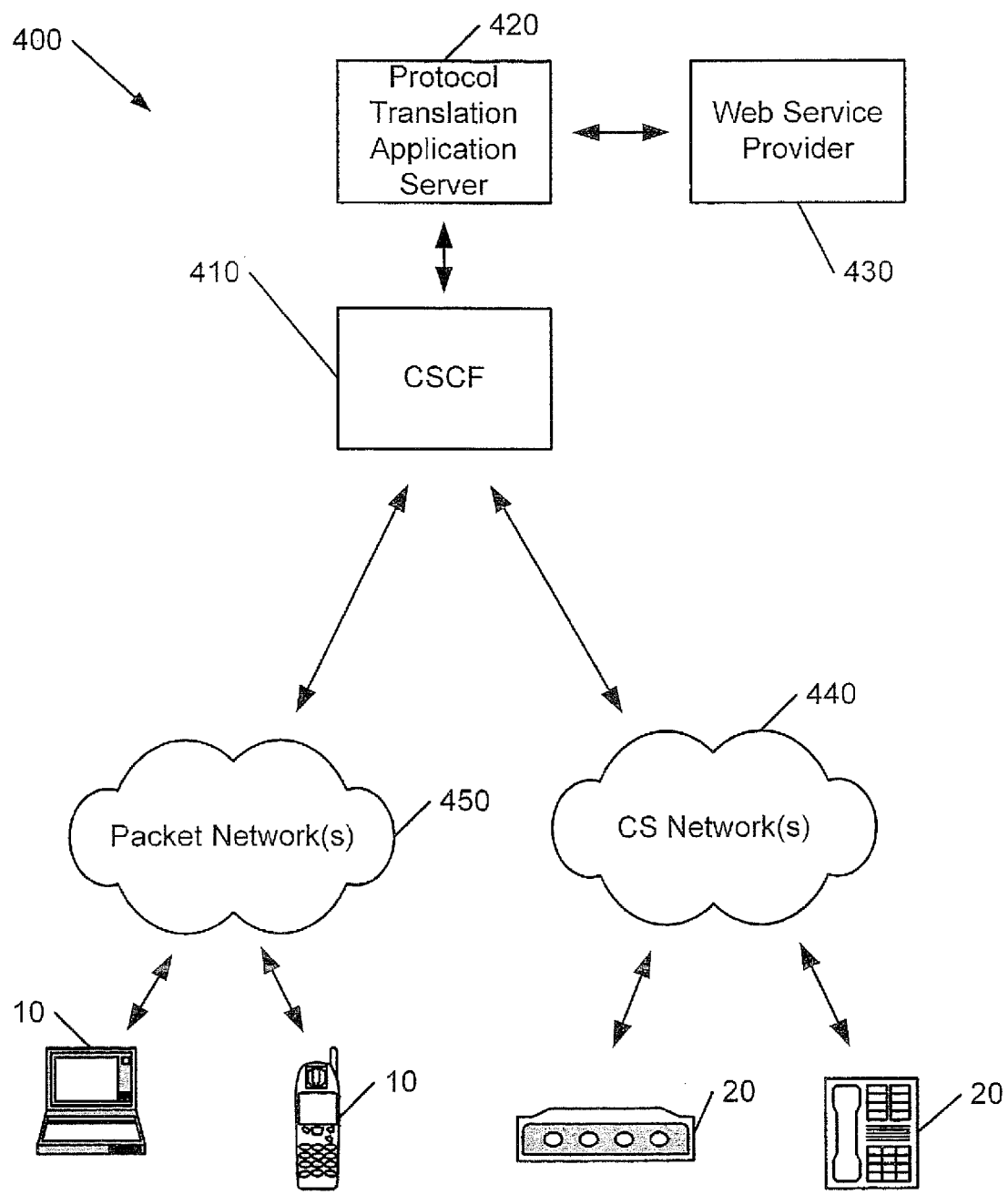
FIG. 4 is a schematic diagram illustrating an IMS network and operations thereof in accordance with some embodiments of the present invention.

According to further embodiments of the present invention, web services may take advantage of IMS authentication capability by using an SIP Application Server (SIP AS) that provides protocol translation (e.g., SIP to HTTP or MQ) used by a web services provider. Referring to FIG. 4, an IMS network 400 configured according to further embodiments of the present invention comprises apparatus configured to provide a variety of different functions linked by standardized interfaces, along lines discussed above with reference to FIG. 1. As further shown, the CSCF 410 may interface with packet data and circuit switched networks 440, 450, which provides connectivity to the IMS network 100 for devices 10, 20, as also discussed above.

According to embodiments illustrated in FIG. 4, a protocol translation SIP AS 420 is part of the IMS network 400 and is configured to provide protocol translation of web request messages between the SIP-based environment of the IMS network 100 and a web service provider 430. The protocol translation SIP AS 420 supports provision of web services to devices 10, 20 that generate SIP-based web service requests, e.g., SOAP messages encapsulated in SIP messages, and receive web services using SIP messages. A trust relationship between the web service provider 430 and the protocol translation SIP AS may obviate the need for individual authentication of web services requests, as the IMS provides security as to the source of the web services requests.

Figure 5:
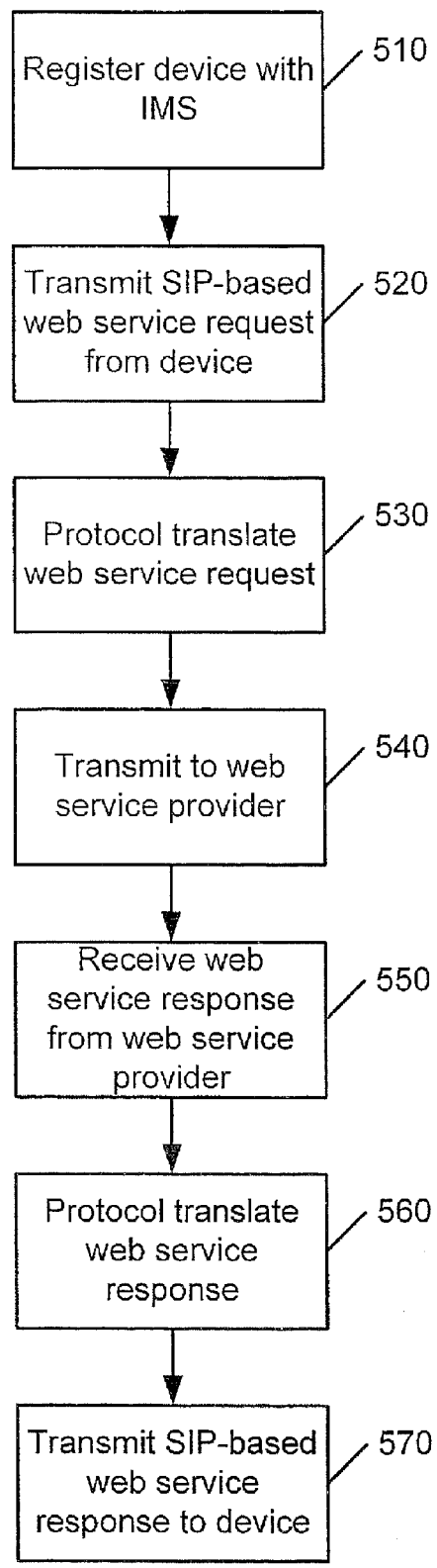
FIG. 5 is a flowchart that illustrates operations for providing web services according to some embodiments of the present invention.

Exemplary operations for provision of web services according to further embodiments of the present invention are illustrated in FIG. 5. A device is registered with the IMS network (block 510). Subsequently, the device transmits a SIP message including a web service request embedded therein (block 520). The IMS network, in particular, the protocal translation SIP AS, protocol translates the SIP-based request to a non-IMS protocol, such as HTTP or MQ (block 530). The protocol-translated web service request is then transmitted to the web service provider (block 540), which, in response, generates a web service response (block 550). The protocol translation SIP AS protocol translates the web service response to SIP (block 560), and forwards the SIP-based web service response back to the requesting device (block 570).

Figure 6:
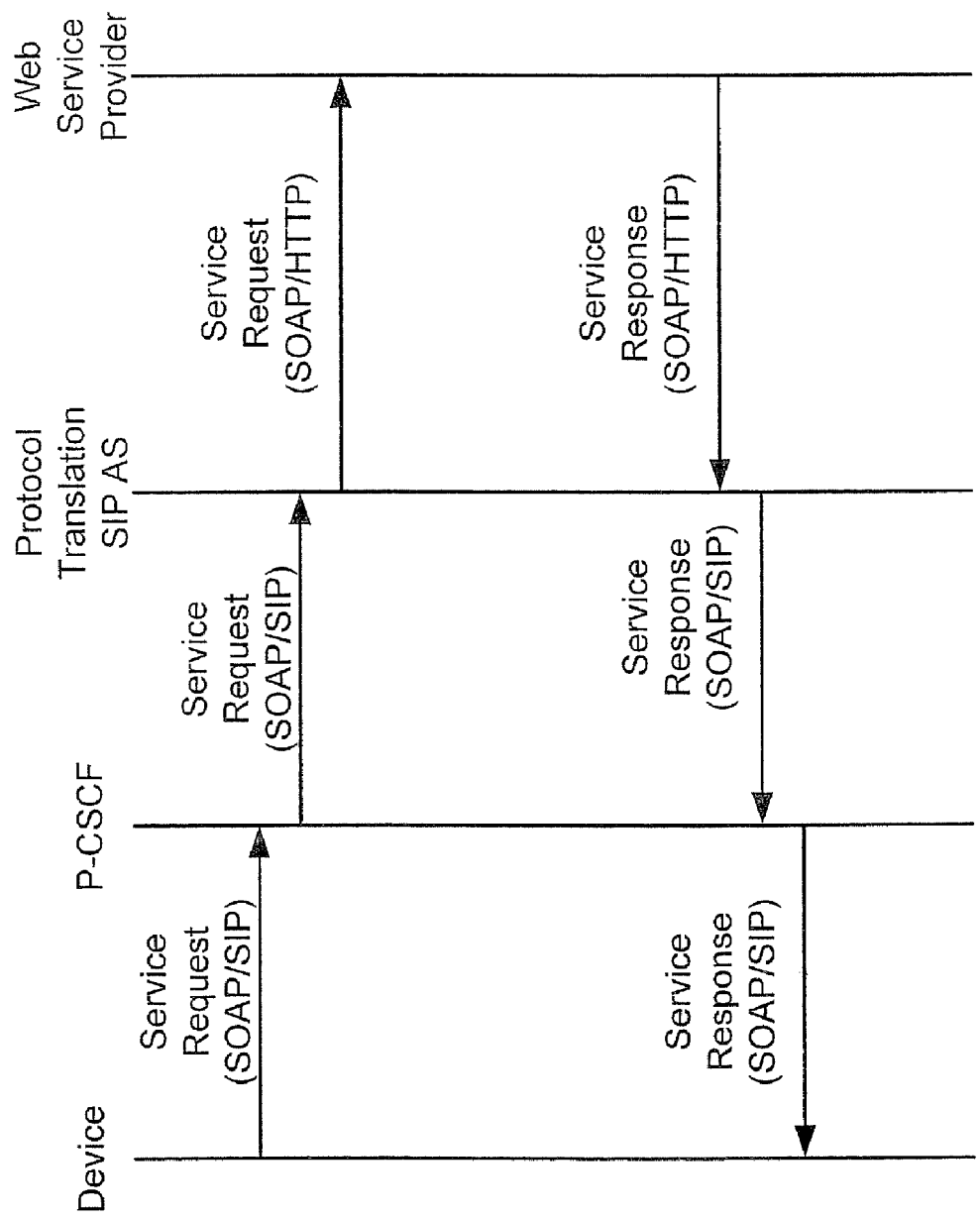
FIG. 6 is a message flow diagram illustrating apparatus and operations for supporting authenticate web service delivery according to some embodiments of the present invention.

FIG. 6 illustrates an exemplary implementation of such procedures according to further embodiments of the present invention. A device transmits a SIP message, which includes a SOAP message embedded therein that defines a web service request, to a P-CSCF of an IMS network. The SIP message may be, for example, a SIP INVITE message that includes a Request-URI, Call-ID, "from" and "to" header fields, and one or more Private (P)-headers. After validation at an P-CSCF, the SIP message is forwarded to the protocol translation SIP AS, which translates the web service request to HTTP and forwards the translated request to the web service provider. In response to receipt of the translated web service request from protocol translation SIP AS, the web service provider generates an HTTP-formatted web service response and transmits it to the protocol translation SIP AS. The protocol translation SIP AS generates a corresponding SIP-formatted message including the web service response, and forwards it to the P-CSCF, and on to the requesting device.

Figure 7:
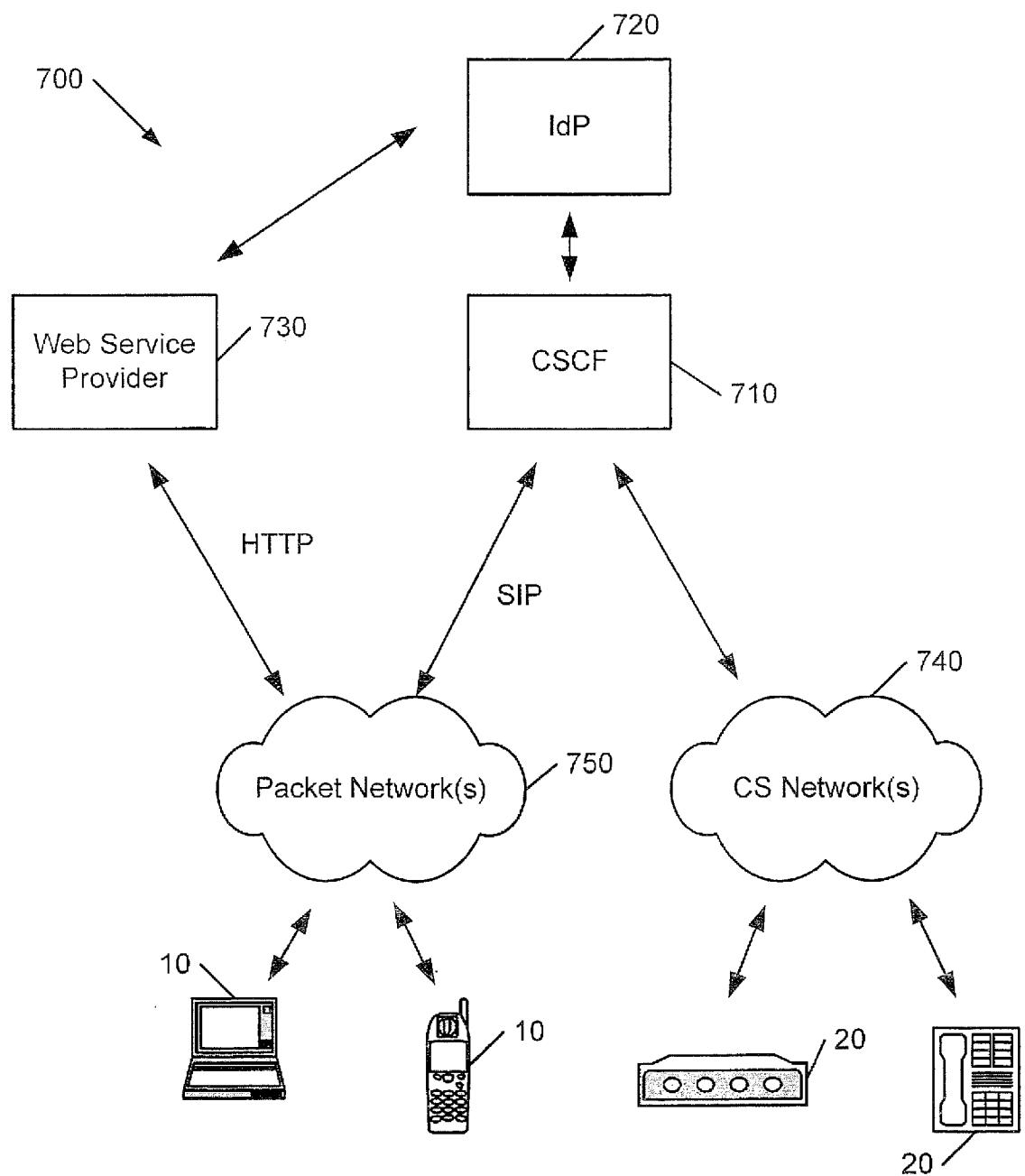
FIG. 7 is a schematic diagram illustrating an IMS network and operations thereof in accordance with some embodiments of the present invention.

According to additional embodiments of the present invention, web services may be provided to a device using HTTP, MQ or other non-SIP protocols in conjuction with providing authentication of web service requests using an IMS network in which the device is registered. Referring to FIG. 7, an IMS network 700 configured according to further embodiments of the present invention comprises apparatus configured to provide a variety of different functions linked by standardized interfaces, including a Call Session Control Function (CSCF) 710, along lines discussed above with reference to FIGS. 1 and 4. It will be understood that these functions may be apportioned among several call session control function proxies or servers, such as Proxy-CSCF(P-CSCF), Interrogating-CSCF (I-CSCF) and Serving-CSCF (S-CSCF), and various other functions, gateways and the like. The CSCF 710 may interface with packet data and circuit switched networks 740, 750 which provide connectivity for devices 10, 20.

According to the illustrated embodiments, packet data enabled devices 10 may transmit web service requests to a web service provider 730 using HTTP or other non-IMS protocol. The web service provider 730 is configured to communicate with a SIP-enabled IdP 720 to support authentication of web service requests via the IMS network 700. Responsive to such authentication, the web service provider 730 may provide web services to the requesting devices 10. More particularly, as discussed in detail below, authentication requests from the web service provider 730 may be used to generate IMS authentication challenges to the devices 10 via the IMS network 700.

Figure 8:
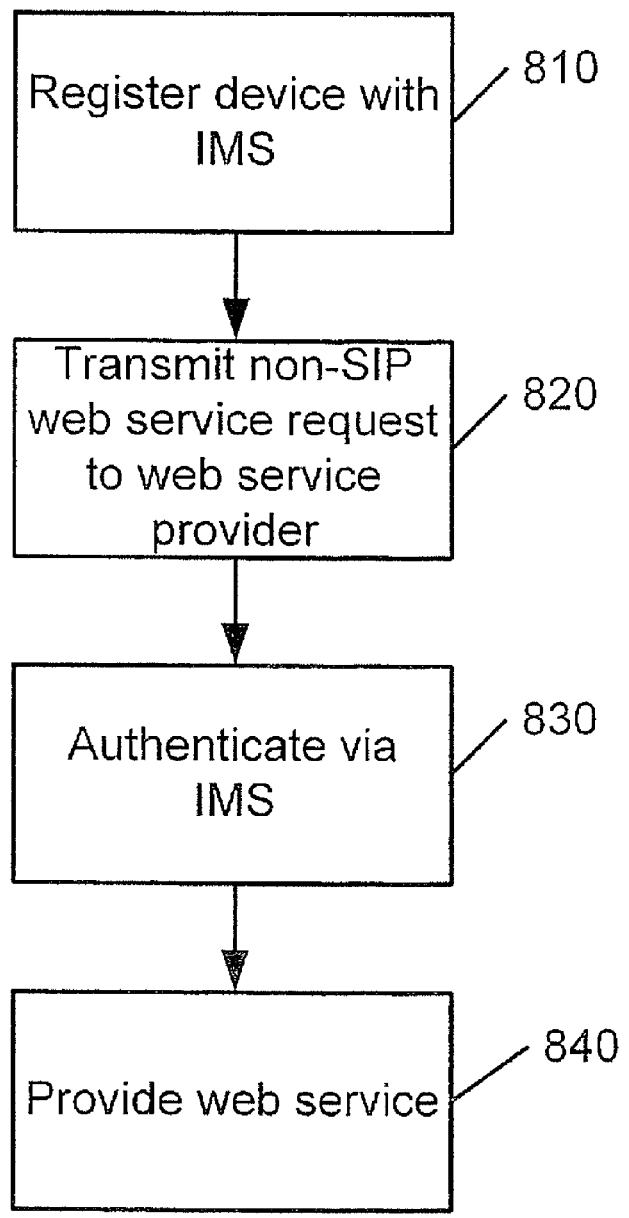
FIG. 8 is a flowchart that illustrates operations for providing web services according to some embodiments of the present invention.

Exemplary operations for provision of web services according to further embodiments of the present invention are illustrated in FIG. 8. A device is registered with the IMS network (block 810). Subsequently, the device transmits a web service request message to the web service provider, e.g., using HTTP (block 820). The web service provider responsively authenticates the web service request via the IMS network (block 830). Responsive to the authentication, the web service provider provides the requested service to the requesting device (block 840).

Figure 9:
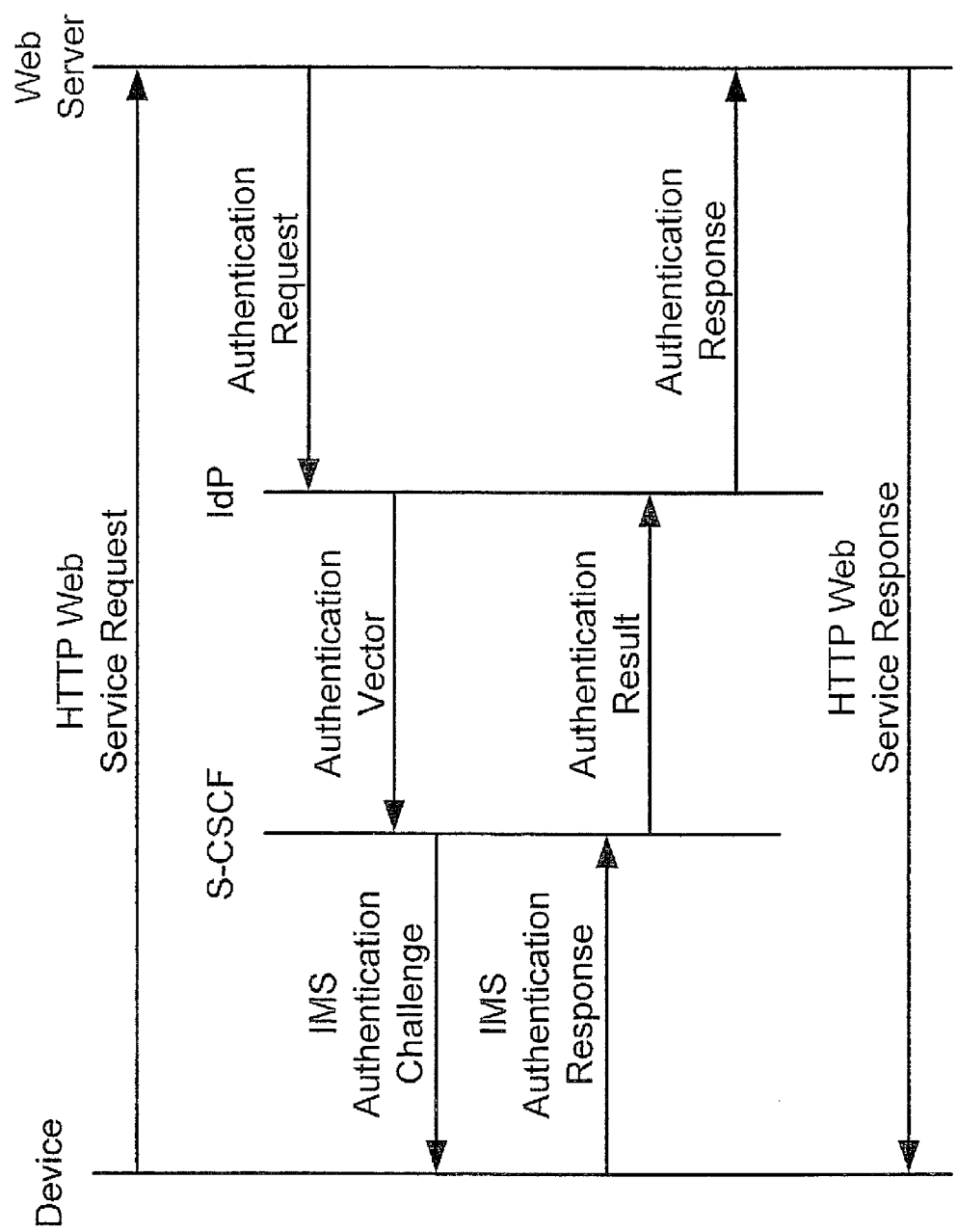
FIG. 9 is a message flow diagram illustrating apparatus and operations for supporting authenticate web service delivery according to some embodiments of the present invention.

FIG. 9 illustrates an exemplary implementation of such procedures according to further embodiments of the present invention. A device transmits an HTTP-encapsulated web service request (e.g., SOAP or non-SOAP) to the web service provider. The web service provider invokes an authentication service of the IdP by sending an authentication request message identifying the source of the web service request (e.g., the value in the "from" address of the HTTP message). The IdP responsively genenerates an authentication vector based the information in the authentication request received from the web service provider, and forwards the vector to an S-CSCF of the IMS network per ETSI TS 33.102v7.0.0. In response, the S-CSCF generates an authentication challenge from the authentication vection and forwards the challenge through a P-CSCF for the device per ETSI TS 33.102v7.0.0. The device generates a corresponding authentication result that is conveyed back to the S-CSCF for comparison to the expected response. If authentication is successful, the S-CSCF forwards an authentication response to the IdP, along with an identity (e.g., IMPU and/or IMPI) of the device. The IdP forwards this information to the web service provider, which responsively provides the requested web service.

Many variations and modifications can be made to the embodiments without substantially departing from the principles of the present invention. All such variations and modifications are intended to be included herein within the scope of the present invention, as set forth in the following claims.

That which is claimed:

1. A method of operating an IP Multimedia Subsystem (IMS) network to support provision of web services, the method comprising:

receiving a Session Initiation Protocol (SIP) message from a device, the SIP message comprising an embedded web service request that requests a web service;

protocol translating the received SIP message to generate a non-IMS message including the web service request;

transmitting the non-IMS message to a web service provider; and transmitting the requested web service corresponding to the non-IMS message from the web service provider to the device;

wherein receiving the SIP message comprising the embedded web service request from the device comprises receiving the SIP message at a Proxy Call Session Control Function (P-CSCF);

wherein protocol translating the received SIP message to generate the non-IMS message including the web service request is preceded by forwarding the received SIP message from the P-CSCF to a protocol translation SIP application server (AS);

wherein protocol translating the received SIP message to generate the non-IMS message including the web service request comprises generating the non-IMS message from the forwarded SIP message at the protocol translation SIP AS; and wherein transmitting the non-IMS message to the web service provider comprises transmitting the non-IMS message from the protocol translation SIP AS to the web service provider.

2. The method of claim 1, wherein forwarding the SIP message from the P-CSCF to the protocol translation SIP AS is preceded by validating the SIP message at the P-CSCF, and wherein forwarding the SIP message from the P-CSCF to the protocol translation SIP AS comprises forwarding the SIP message from the P-CSCF to the protocol translation SIP AS responsive to validation of the SIP message at the P-CSCF.

3. A method of operating an IP Multimedia Subsystem (IMS) network to support provision of web services, the method comprising:

receiving a Session Initiation Protocol (SIP) message from a device, the SIP message comprising an embedded web service request that requests a web service;

protocol translating the received SIP message to generate a non-IMS message including the web service request;

transmitting the non-IMS message to a web service provider; and transmitting the requested web service corresponding to the non-IMS message from the web service provider to the device;

wherein the SIP message comprises a first SIP message and wherein transmitting a requested web service corresponding to the non-IMS message from the web service provider to the device comprises:

transmitting a web service response providing the requested web service to the protocol translation SIP AS;

protocol translating the web service response to generate a second SIP message including the web service response; and transmitting the second SIP message to the P-CSCF.

4. The method of claim 3, wherein the web service request and web service response comprise respective Simple Object Access Protocol (SOAP) messages.

5. The method of claim 1, wherein the SIP message comprises a SIP INVITE message.

6. The method of claim 1, wherein protocol translating the received SIP message to generate the non-IMS message including the web service request comprises:

extracting identification information from the SIP message; and including the extracted identification information in a web services security element in a header of a SOAP message included in the non-IMS message.

7. The method of claim 1, wherein the web service request comprises a SOAP message.

8. The method of claim 1, wherein the non-IMS message conforms to a Hypertext Transport Protocol (HTTP) or an MQ protocol.

9. A method of supporting web services in an IMS network, the method comprising:
- receiving a SIP message comprising an embedded web service request from a P-CSCF of the IMS wherein the SIP message comprises a first SIP message;
- protocol translating the received SIP message to generate a non-IMS message including the web service request;
- transmitting the non-IMS message to a web service provider;
- receiving a web service response providing a requested web service from the web service provider; and
- protocol translating the web service response to generate a second SIP message including the web service response; and
- transmitting the second SIP message to the P-CSCF.

10. The method of claim 9, wherein protocol translating the received SIP message to generate the non-IMS message including the web service request comprises:
- extracting identification information from the SIP message; and
- including the extracted identification information in a web services security element in a header of a SOAP message included in the non-IMS message.

11. The method of claim 9, wherein the SIP message comprises a SIP INVITE message.

12. The method of claim 9, wherein the web service request comprises a SOAP message.

13. The method of claim 9, wherein the non-IMS message conforms to a Hypertext Transport Protocol (HTTP) or an MQ protocol.

14. A method of operating an IP Multimedia Subsystem (IMS) network to support provision of web services, the method comprising:
- receiving a Session Initiation Protocol (SIP) message from a device, the SIP message comprising an embedded web service request that requests a web service;
- protocol translating the received SIP message to generate a non-IMS message including the web service request;
- transmitting the non-IMS message to a web service provider;
- transmitting the requested web service corresponding to the non-IMS message from the web service provider to the device;
- receiving an authentication request from the web service provider requesting authentication of the device;
- sending an IMS authentication challenge to the device via the IMS network responsive to the authentication request;
- receiving an IMS authentication request from the device via the IMS network; and
- sending an authentication response to the web service provider responsive to the IMS authentication request.

\* \* \* \* \*